US 6,527,441 B1

(12) United States Patent
Cranch et al.

(10) Patent No.: US 6,527,441 B1
(45) Date of Patent: Mar. 4, 2003

(54) TEMPERATURE SENSING APPARATUS

(75) Inventors: Geoffrey A Cranch, Winfrith (GB); Roger Crickmore, Winfrith (GB)

(73) Assignee: Qinetiq Limited, London (GB)

( * ) Notice: Subject to any disclaimer, the term of this patent is extended or adjusted under 35 U.S.C. 154(b) by 0 days.

(21) Appl. No.: 09/719,793

(22) PCT Filed: Jun. 11, 1999

(86) PCT No.: PCT/GB99/01867
§ 371 (c)(1),
(2), (4) Date: Jan. 2, 2001

(87) PCT Pub. No.: WO99/66298
PCT Pub. Date: Dec. 23, 1999

(30) Foreign Application Priority Data

Jun. 18, 1998 (GB) .............................................. 9813095

(51) Int. Cl.⁷ ............................ G01K 11/32; G02B 6/00
(52) U.S. Cl. ....................... 374/161; 374/120; 374/143; 385/12; 250/227.18
(58) Field of Search ................................ 374/161, 120, 374/143; 385/12, 13; 250/227.11, 227.14, 227.18

(56) References Cited

U.S. PATENT DOCUMENTS

| | | | | |
|---|---|---|---|---|
| 4,295,739 A | * | 10/1981 | Meltz et al. ................. | 374/161 |
| 5,095,514 A | | 3/1992 | Curtis ........................... | 385/12 |
| 5,367,589 A | | 11/1994 | MacDonald et al. ......... | 385/37 |
| 5,399,854 A | * | 3/1995 | Dunphy et al. ............... | 356/32 |
| 5,493,390 A | * | 2/1996 | Varasi et al. ................. | 356/32 |
| 5,513,913 A | * | 5/1996 | Ball et al. .................... | 374/120 |
| 5,563,967 A | * | 10/1996 | Haake ........................... | 385/12 |
| 5,564,832 A | * | 10/1996 | Ball et al. .................... | 374/161 |

FOREIGN PATENT DOCUMENTS

| | | |
|---|---|---|
| DE | 43 37 402 A | 4/1995 |
| EP | 0 800 098 A2 * | 10/1997 |
| EP | 0 867 736 A2 * | 3/1998 |
| GB | 2 326 471 A | 12/1998 |
| WO | 98/12525 A | 3/1998 |
| WO | 98/31987 A | 7/1998 |

OTHER PUBLICATIONS

Song et al., "Simultaneous measurement of temperature and strain using two fiber Bragg gratings embedded in a glass tube", Opt. Fiber Tech., vol. 3, No. 2, XP002083806,, Apr. 1, 1977, pp. 194–196.*

Anonymous: "Les Capteurs Fibres Optiques Op Rationnels?" Mesures Regulation Automatisme, vol. 51, No. 13, Oct. 1986, pp. 49–51, 53, 55–58 (XP 2083807A).

* cited by examiner

Primary Examiner—Diego Gutierrez
Assistant Examiner—Stanley J. Pruchnic, Jr.
(74) Attorney, Agent, or Firm—Nixon & Vanderhye P.C.

(57) ABSTRACT

Temperature sensing apparatus comprises a source of electromagnetic radiation (1), a wavelength-selective element (3) which interacts with radiation emitted from the source (1) and a detection system (6) which monitors radiation from the wavelength-selective element (3). The wavelength-selective element (3) is fixedly mounted on a substantially rigid substrate (not shown). The apparatus can be used for temperature sensing in aquatic environments.

20 Claims, 3 Drawing Sheets

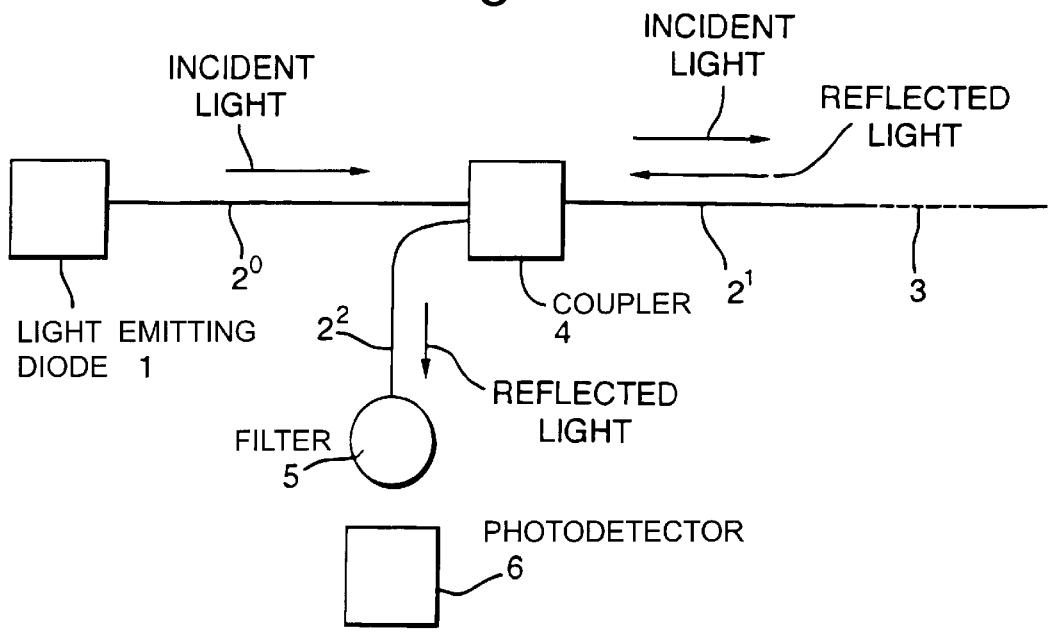
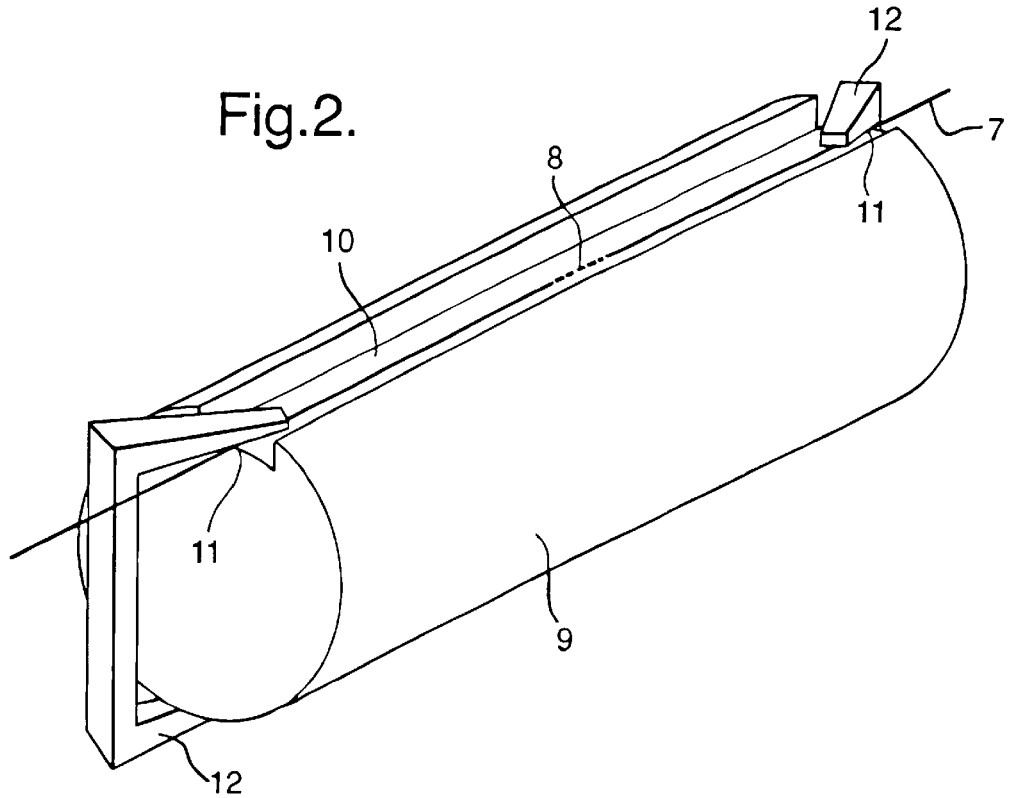

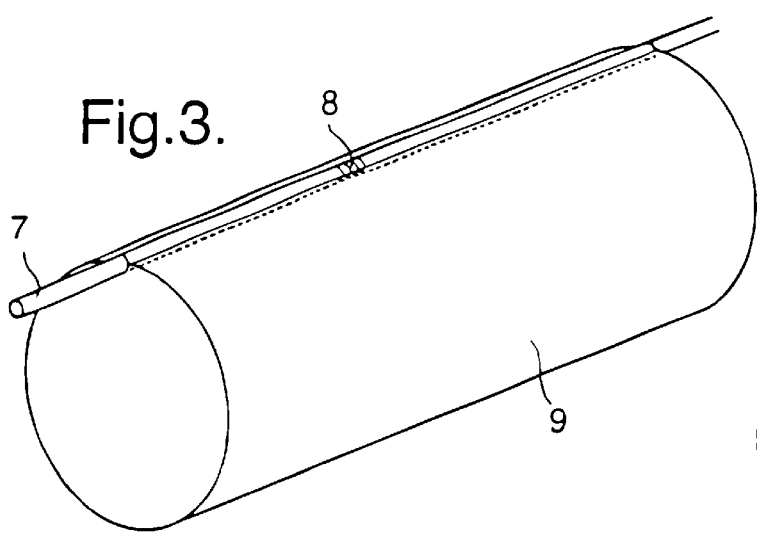
Fig.3.
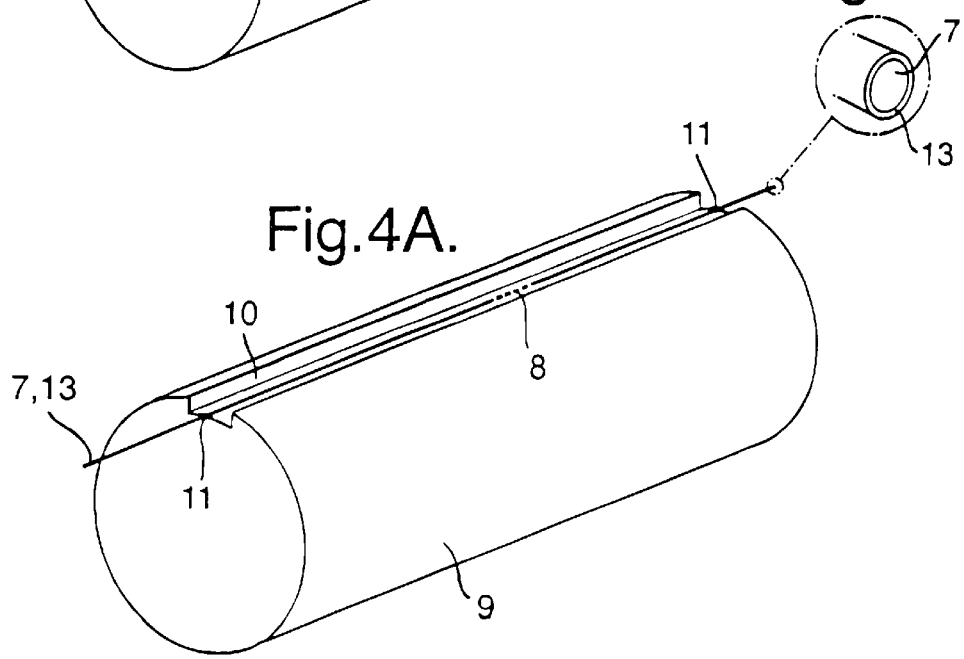
Fig.4B.
Fig.4A.
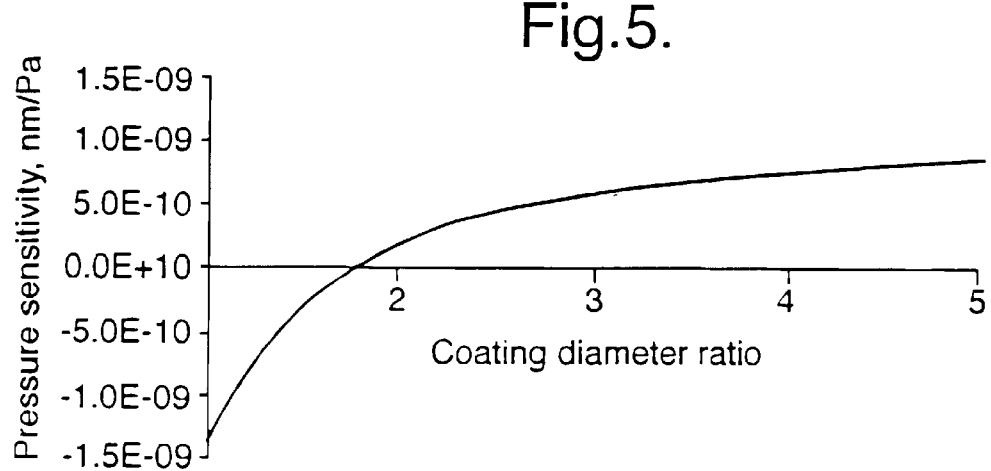
Fig.5.

TEMPERATURE SENSING APPARATUS

BACKGROUND OF THE INVENTION

1. Field of the Invention

This invention relates to a temperature sensing apparatus. More particularly, this invention relates to temperature sensing apparatus such as those using diffraction gratings and other wavelength-selective elements.

2. Discussion of Prior Art

Bragg diffraction gratings have been used to measure temperature, pressure and strains, particularly in the oceanographic environment (S. W. James et al., Electronics Letters, 32(12), 1996 and J. Jones, OFS 12, p.36–39, 1997), by their incorporation into apparatus which monitor the change in the diffraction condition as the temperature, pressure and strain change. A typical sensing apparatus comprises a light source, a diffraction grating (which diffracts the incident light in a manner dependent on the pressure, temperature and non-hydrostatic stress) and a detector which monitors the light diffracted bu. the grating.

In such an apparatus, changes in the Bragg diffraction condition occur due to variations in pressure, temperature and non-hydrostatic stress. It is, therefore, difficult to discriminate between changes in diffraction condition caused by changes in only one of these variables. This has been a problem when trying to make temperature sensing apparatus, but has been overcome by the use of two gratings which respond differently to changes in pressure and temperature (S. W. James et al., Electronics Letters, 32(12), 1996). Another solution is to use a suitable detection system (J. Jones, OFS 12, p.36–39, 1997). However, both of these methods have disadvantages in that they are expensive and complex.

SUMMARY OF THE INVENTION

In accordance with the present invention a temperature sensing apparatus comprises a source of electromagnetic radiation; a wavelength-selective element which interacts with radiation emitted from the source; and a detection system which monitors radiation from the wavelength-selective element; wherein the wavelength-selective element is fixedly mounted on a substantially rigid substrate.

This provides a cost-effective, versatile and simple temperature sensing apparatus.

In one embodiment, the wavelength-selective element is mounted under strain such that the interaction of the wavelength-selective element and the radiation, and the characteristics of the radiation monitored by the detection system, are substantially independent of pressure.

In an alternative arrangement, the wavelength-selective element is fixedly mounted to the rigid substrate such that the wavelength-selective element is substantially strain-relieved between its mounting points.

This provides a temperature sensing apparatus whose response is substantially independent of stress applied external to the mounting points of the wavelength selective element.

The wavelength-selective element may be located in a recess in the substrate or in a cavity within the substrate. This affords physical protection to the element. The cavity is preferably pressure-sealed and the substrate is substantially incompressible. Thus, a cavity filled with air would be at a relatively constant pressure, independent of the external pressure.

The cavity may be at least partially filled with a fluid with a high thermal conductivity. This improves the speed of response of the temperature sensing apparatus.

In a preferred embodiment, the wavelength-selective element is attached to the substrate by means of mechanical clamps. This system is easy to implement.

Alternatively, the wavelength-selective element is attached to the substrate by means of an adhesive such as solder or an epoxy resin. This gives a permanent strong bond and is easy to implement.

Where the wavelength-selective element is mounted under strain, the wavelength-selective element may be embedded in the substrate. This protects the element from physical and chemical damage.

Alternatively, when the wavelength-selective element is mounted under strain, the wavelength-selective element may be partially embedded in the substrate. This gives support to the element and yields a faster response to changes in temperature than is achieved by wholly embedding the element in the substrate.

Preferably, the wavelength-selective element is covered with at least one additional coating of a material with a low bulk modulus. This further reduces sensitivity to changes in pressure if the fibre is attached under strain to the substrate. The coating supports the wavelength-selective element and protects it from physical damage.

The material with a low bulk modulus is preferably an organic polymer, such as polystyrene. Rexolite, Hytrel 5526 or polyurethane 3130. Mixtures of materials could be used. These materials are cheap and easy to deposit.

In one particular embodiment, two or more wavelength-selective elements are arranged so as to further reduce the pressure dependence.

The wavelength-selective element is preferably an in-fibre grating made substantially of silica with a small dopant content. The dopant is preferably chosen from one of germania, phosphorus and aluminium. The germania-doped fibre is cheap and readily available in the electro-optics industry. The use of silica fibres allows the grating structure to be part of the light transmitting fibre.

Preferably, the substrate comprises a metal. Suitably, the metal is chosen from one of tin, lead and antimony. If the wavelength-selective element is attached under strain to the substrate, then these metals have the right physical properties for the apparatus to have a high sensitivity to changes in temperature and a low sensitivity to changes in pressure.

Preferably, the detection system comprises an optical filter and a photodetector. This provides a cheap and simple detection system.

Alternatively, the detection system comprises an interferometric interrogation system, which provides very high sensitivity and fast response.

BRIEF DESCRIPTION OF THE DRAWINGS

Examples of a temperature sensing apparatus in accordance with the invention will now be described with reference to the accompanying drawings of which:

FIG. 1 is a schematic representation of an example of a framework of a temperature sensing apparatus in accordance with the present invention;

FIG. 2 is a perspective view of one example of a fibre arrangement in a temperature sensing apparatus in accordance with the present invention;

FIG. 3 is a perspective view of a second example of a fibre arrangement in a temperature sensing apparatus in accordance with the present invention;

FIG. 4a is a perspective view of a third example of a fibre arrangement in a temperature sensing apparatus in accordance with the present invention, FIG. 4b is an exploded view of the end of the fibre of FIG. 4a;

FIG. 5 is a graph showing predicted sensitivity to change in pressure versus coating diameter ratio for the fibre arrangement in FIG. 4a;

DETAILED DISCUSSION OF EMBODIMENT

Figure 6:
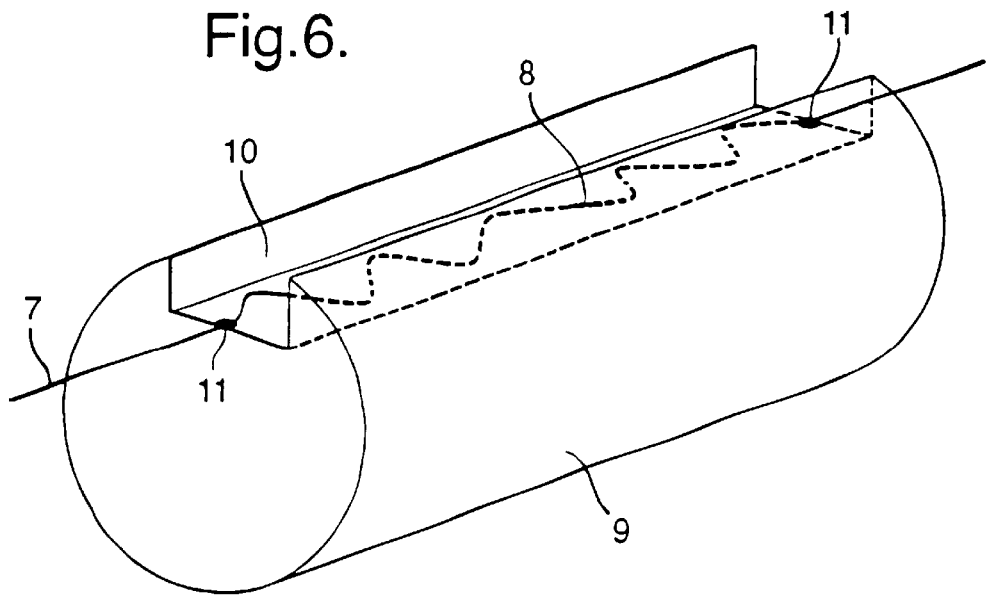
FIG. 6 is a perspective view of a fourth example of a fibre arrangement in a temperature sensing apparatus in accordance with the present invention.

FIG. 1 shows an example of a framework of a temperature sensing apparatus in accordance with the present invention comprising a broad-band light source, in this case an extra-bright light emitting diode (ELED) 1; single-mode optic fibres 2 containing an in-fibre grating structure 3; a directional coupler 4; an optical filter 5 and a photodetector 6. The in-fibre grating structure 3 is fixedly mounted on a substantially rigid substrate (not shown). In a conventional apparatus, the in-fibre grating structure 3 is free-standing i.e. it is not fixedly mounted on a substrate. The light produced by the ELED 1 is of 1550 nm wavelength with a 40 nm bandwidth and is transmitted through the fibre $2^0$ and $2^1$ onto the grating 3. The grating 3 reflects a narrow bandwidth of light back through the fibre $2^1$ through the directional coupler 4 and fibre $2^2$ into the optical filter 5. The filter 5 is chosen so that the intensity of light transmitted to the photodetector 6 depends on the wavelength of light incident on the filter 5. The wavelength of the reflected light is determined by the mean refractive index of the grating 3 and the pitch of the grating 3 as shown in Equation 1:

$$\lambda_B = 2n\Lambda \qquad \text{Equation 1}$$

where n is the mean refractive index of the grating, 3, $\Lambda$ is the pitch of the grating 3 and $\lambda_B$ is the wavelength of the reflected light (or the Bragg resonance wavelength).

In a conventional system, both the pitch of the grating 3 and the refractive index of the grating 3 are sensitive to changes in pressure and temperature and so changes in the intensity of the light transmitted to the photodetector 6 are dependent on changes in pressure as well as temperature.

Note that in an alternative example, it would be possible to measure the properties of the light transmitted by the in-fibre grating 3, rather than those of the reflected light, in order to sense changes in temperature and pressure.

In this example, the grating 3 is made in a silica fibre $2^1$, doped with germania. Modulations in refractive index along the length of the fibre $2^1$ (i.e. the grating structure) are achieved, for example, by previously subjecting the fibre $2^1$ to the standing wave pattern established by two interfering coherent beams from a high power UV laser. Hence, a section of the Fibre $2^1$ is a one-dimensional diffraction grating 3, with a pitch of typically 500 nm.

Equations have been established relating the change in Bragg resonance wavelength to changes in temperature and pressure for the grating 3.

The change in Bragg resonance wavelength associated with a change in pressure (at constant temperature) for an unsupported grating structure 3 (as in a conventional apparatus) is given in Equation 2.

$$\left.\frac{\Delta\lambda_B}{\Delta P}\right|_T = \frac{2n\Lambda}{\Delta P}\left[\varepsilon_{z0} - \frac{n^2}{2}(p_{12}\varepsilon_{z0} + (p_{11}+p_{12})\varepsilon_{r0})\right] \qquad \text{Equation 2}$$

where $\epsilon$ represents the strain components. T is the temperature. P is the pressure and p represents the Pockel's coefficients. The first term is the contribution from the length change due to axial strain and the second and third terms are due to the refractive index change from the axial and radial strains respectively.

The change in Bragg resonance wavelength associated with a change in temperature (at constant pressure) for an unsupported grating structure 3 (as in a conventional apparatus) is given in Equation 3.

$$\left.\frac{\Delta\lambda_B}{\Delta T}\right|_P = 2n\Lambda\left[\frac{1}{n}\left(\frac{\partial n}{\partial T}\right)_\rho + \frac{1}{\Delta T}\left(\varepsilon_{z0} - \frac{n^2}{2}(p_{12}\varepsilon_{z0} + (p_{11}+p_{12})\varepsilon_{r0})\right)\right] \qquad \text{Equation 3}$$

where p is the density. The first term is the refractive index change due to change in temperature for constant density, the second, third and fourth terms refer to the change in length due to axial strain, the refractive index change due to axial strain and the refractive index change due to radial strain respectively. The first term generally dominates.

The measured values of sensitivity of the Bragg resonance wavelength to changes in temperature and pressure for an unsupported grating structure 3 compare well with those determined using a well-known theoretical model based on Equations 2 and 3. A value for the theoretical sensitivity of the Bragg resonance wavelength to changes in non-hydrostatic stress is also given. This assumes that the force, F, is applied axially along the fibre and that the fibre is unconstrained in the radial direction.

| Parameter | Measured Value | Theoretical value |
|---|---|---|
| $\left.\frac{\Delta\lambda_B}{\Delta P}\right|_T$ | $-3.1 \times 10^{-9}$ nmPa$^{-1}$ | $-3.6 \times 10^{-9}$ nmPa$^{-1}$ |
| $\left.\frac{\Delta\lambda_B}{\Delta T}\right|_P$ | $1.1 \times 10^{-2}$ nmK$^{-1}$ | $1.0 \times 10^{-2}$ nmK$^{-1}$ |
| $\left.\frac{\Delta\lambda_B}{\Delta F}\right|_{P,T}$ | | $1.4$ nmN$^{-1}$ |

These data show that the Bragg resonance wavelength of the bare, unsupported grating shows significant sensitivity to changes in temperature, pressure and non-hydrostatic stress. This system using bare unsupported grating structure 3 has been proposed for use as a temperature sensing apparatus, since the Bragg resonance wavelength changes as the temperature changes. Conventional systems suffer from the fact that the grating 3 is also sensitive to changes in pressure and non-hydrostatic stress and so a temperature sensing apparatus cannot be achieved without accounting for the changes in Bragg resonance that occur due to changes in pressure and applied stress.

A temperature sensing apparatus according to the present invention addresses this problem by using a fibre arrangement generally as shown in FIG. 1 and in this example the fibre $2^1$ is mounted under strain to a substantially rigid support. An example of a fibre arrangement in accordance with the present invention is shown in FIG. 2, which shows a single-mode optic fibre 7 containing an in-fibre grating structure 8 (note that the discontinuities shown in the fibre 7 do not represent real breaks in the fibre 7); a substrate 9; a recess 10 in the substrate 9; attachments 11 between the fibre 7 and the substrate 9 formed by rigid clamps 12 which engage the recess 10. The substrate 9 is of substantially greater rigidity than the fibre 7 and, in this example, is a cylindrical bar made from tin. The fibre 7 is located within a longitudinal recess 10 within the substrate 9 and is attached under strain to the substrate 9 using rigid clamps 12. The fibre 7 is not shielded from the external pressure. The attachments 11 created by the rigid clamps 12 between the fibre 7 and the substrate 9 ensure that the strains experienced by the fibre 7 are determined by the strains in the substrate 9. The substrate 9 effectively determines the axial strain in the fibre 7. The axial strain in the substrate 9 is given by:

$$\varepsilon_{z\text{-}bar} = \frac{P}{E_{bar}}(2v_{bar} - 1) \qquad \text{Equation 4}$$

where $\varepsilon_{z\text{-}bar}$ is the axial strain in the substrate 9. $E_{bar}$ is the Young's modulus of the substrate 9 and $v_{bar}$ is the Poisson's ratio of the substrate 9. By carefully choosing the mechanical properties of the substrate 9, the dependence of the Bragg resonance wavelength on pressure can be greatly reduced. Given $E_{glass}$=72 GPa. $v_{glass}$=0.23, $p_{11}$=0.121 and $p_{12}$=0.270 for the glass fibre (where $E_{glass}$ and $v_{glass}$ are the Young's modulus and Poisson's ratio of glass, respectively) and a tin substrate, then the predicted sensitivity of the Bragg resonance wavelength to changes in pressure is reduced from $-3.6\times10^{-9}$ nmPa$^{-1}$ for the unsupported grating 3 to $-1.4\times10^{-9}$ nmPa$^{-1}$ for the supported grating 8. The presence of the small recess 10 should have little effect on the predicted sensitivity to changes in pressure and temperature. Given optimum parameters, the present invention allows the manipulation of the components of strain induced in a Bragg grating under pressure such that their total contribution to the change in Bragg resonance wavelength is small i.e. the temperature sensing apparatus is substantially insensitive to pressure. The attachments 11 ensure that the grating structure 8 is substantially isolated from changes in non-hydrostatic stress that are experienced by the fibre 7 external to the attachments 11. This strain relief ensures that the temperature measurements provided by this apparatus are substantially independent of any non-hydrostatic strain experienced by the section of the fibre 7 external to the attachments 11.

The attachment of the fibre 7 to the substrate 9 increases the responsivity of the sensing apparatus to changes in temperature. The predicted sensitivity of the Bragg resonance wavelength to changes in temperature is increased by a factor of two by the attachment of the fibre 7 to the substrate 9, if the substrate 9 is considered to be cylindrical.

The location of the fibre 7 in the recess 10 allows the fibre 7 to be open to ambient conditions, giving fast response to changes in temperature, while being physically protected from damage. The length of the attachment 11 of the fibre 7 can be varied and there are many possible methods of attachment. In this example, rigid clamps 12 are used, but other methods of attachment such as soldering or use of glues (e.g. epoxy resins) could be used.

In a further example, as shown in FIG. 3, a fibre arrangement in a temperature sensing apparatus in accordance with the present invention comprises a single-mode optic fibre 7 with an in-fibre grating structure 8 and a substrate 9. There is no recess in the substrate. The fibre 7 is embedded, at least partially, in the substrate 9 and the fibre 7 is under strain. The embedding of the fibre 7 protects the fibre 7 from physical damage and provides support.

A further example is shown in FIGS. 4a and 4b. The fibre arrangement in a temperature sensing apparatus in accordance with the present invention comprises a single-mode optic fibre 7 containing an in-fibre grating structure 8; a substrate 9; a recess 10 in the substrate 9; a coating 13 of the fibre 7; and attachments 11 between the fibre 7 and the substrate 9. The recess 10 protects the fibre 7 from physical damage. The fibre 7 is attached to the substrate 9 under strain. The substrate 9 effectively determines the axial strain in the fibre 7, whereas the coating 13 effectively determines the radial strain experienced by the fibre 7. The addition of the coating 13 gives rise to greater insensitivity to changes in pressure than with a bare fibre 7. The coating 13 may be a hard coating such as a metal or a soft coating such as an organic polymer. For example, a coating 13 of polyurethane is deposited by an evaporation process. FIG. 5 shows how the predicted sensitivity of the Bragg resonance wavelength to changes in pressure can be modified by altering the thickness of the coating 13. The substrate 9 is of tin and the coating 13 has properties typical of a soft organic polymer (Young's modulus of 0.3 GPa, Poisson's ratio of 0.3). The coating diameter ratio is defined in Equation 5.

Coating diameter ratio=Radius of fibre+thickness of coating/Radius of fibre      Equation 5

The predicted pressure sensitivity of a bare fibre that is not attached to a substrate is $3.6\times10^{-9}$ nmPa$^{-1}$. FIG. 5 shows predicted sensitivity to change in pressure versus coating diameter ratio (the ratio of the diameter of the fibre and a coating to the diameter of the fibre). This shows that the addition of the coating 13 to the fibre 7 decreases the pressure sensitivity of the temperature sensing apparatus. The thickness of the coating 13 is typically 70 microns, but can be altered to minimise the sensitivity to changes in pressure. This is particularly important if there is uncertainty in the mechanical properties of the substrate 9. Conversely, the mechanical properties of the substrate 9 can be chosen so that a large error in the thickness of the coating 13 has little affect on sensitivity to pressure.

Another example of a fibre arrangement in a temperature sensing apparatus in accordance with the present invention is shown in FIG. 6. The fibre arrangement comprises a single-mode optic fibre 7 that incorporates an in-fibre grating structure 8; a substrate 9; a recess 10 in the substrate 9; and attachments 11 between the substrate 9 and fibre 7. The fibre 7 is located in the recess 10 in the substrate 9. In this case the attachments 11 are provided using epoxy resin adhesive. The substrate 9 is steel and the recess 10 is designed to provide the fibre 7 with protection from physical damage. The length of the section of fibre 7 between the attachments 11 is sufficiently greater than the distance between the attachments 11 such that changes in the dimensions of the substrate 9 due to changes in temperature, pressure and applied (non-hydrostatic) stress do not give rise to an applied strain in the section of fibre 7 containing the grating structure 8. The fibre 7 is strain-relieved between the attachments 11. Thus, application of a force to the fibre 7 external to the attachments 11 will not give rise to strain in the grating structure 8. Hence, this very simple fibre arrangement yields a temperature sensing apparatus which is substantially independent of applied (non-hydrostatic) stress. The attachments 11 could be facilitated using solder or clamps. The substrate 9 could alternatively be made from any other rigid material, such as a metal or a rigid plastic.

Figure 7:
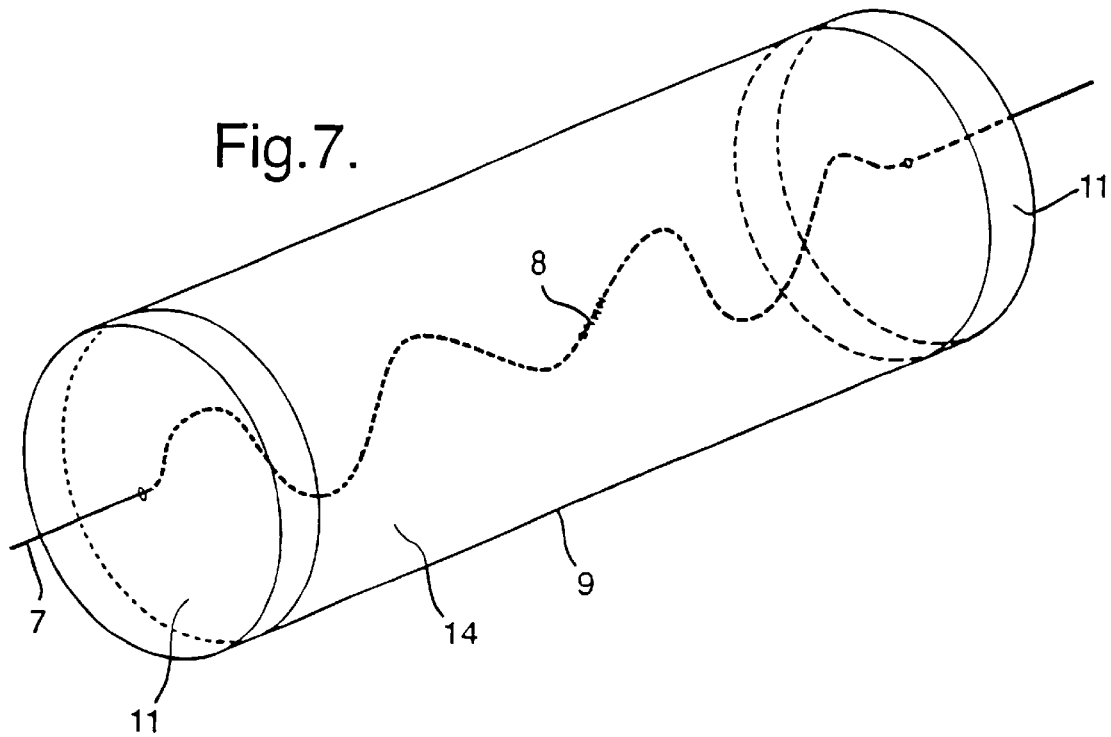
FIG. 7 is a perspective view of a fifth example of a fibre arrangement in a temperature sensing apparatus in accordance with the present invention.

A further example of a fibre arrangement that could be used in a temperature sensing apparatus in accordance with the present invention is shown in FIG. 7. The fibre arrangement comprises a single-mode optic fibre 7 containing an in-fibre grating structure 8; a substrate 9; attachments 11 between the fibre 7 and tubular cylindrical substrate 9, and a cavity 14 within the substrate 9. The fibre 7 is mounted to the substrate 9, which in this case is a steel tube, using two plugs of epoxy resin as attachments 11. The section of fibre 7 containing the grating structure 8 is not under strain and the attachments provide strain-relief for the section of fibre 7 between the attachments 11. The tubular structure of the substrate 9 provides protection from physical damage for the fibre 7. Such a fibre arrangement provides a temperature sensing apparatus which is substantially independent of applied strain. The cavity 14 is, in this case, filled with air.

The substrate 9 and attachments 11 are arranged such that the cavity 14 within the substrate 9 is pressure-sealed from the external environment. The substrate/attachment ensemble is designed to be substantially incompressible. Since the cavity 14 is pressure-sealed and filled with air, and since the substrate/attachment ensemble is substantially incompressible, the grating structure 8 only experiences the pressure at which the cavity 14 was filled. Hence, the response of a temperature sensing apparatus using such a fibre arrangement would be substantially independent of pressure and substantially independent of non-hydrostatic stress that is applied to the fibre 7 or substrate 9.

If the cavity 14 is filled with air or any other thermally non-conductive material, then the thermal response of the apparatus could be slow. If the cavity 14 is filled with a thermally conductive fluid, such as heat sink compound, then thermal response could be fast, as long as the substrate 9 is made from a thermally conductive material. However, if the cavity 14 is completely filled with a substantially incompressible fluid, then any force applied to the substrate 9 and attachments 11 by hydrostatic pressure is transmitted to the fibre 7 and the response of the fibre 7 is no longer substantially insensitive to pressure. This problem may be much reduced by partially filling the cavity 14 with a thermally-conductive compound, leaving an air space in the cavity 14. This should ensure that the response to pressure is much reduced. Immersion of the grating structure 8 within the thermally conductive fluid should ensure that response to change in temperature should be rapid.

What is claimed is:

1. Temperature sensing apparatus for measuring the temperature of a fluid, the apparatus comprising:
    a source of electromagnetic radiation;
    a substantially rigid substrate;
    a wavelength-selective element, said element fixedly mounted under strain with respect to the substantially rigid substrate, said element interacts with radiation emitted from the source, said element comprising an optical fiber, said fiber including a grating structure; and
    a detection system which monitors wavelength of the radiation from the wavelength-selective element, wherein the mechanical properties of the substrate are chosen so that the sensitivity of the Bragg resonance wavelength is sufficiently reduced permitting the interaction of the wavelength selective element and the radiation to be substantially independent of external pressure.

2. Temperature sensing apparatus according to claim 1, wherein the wavelength-selective element is located in a recess in the substrate.

3. Temperature sensing apparatus according to claim 1, wherein the wavelength-selective element is located in a cavity within the substrate.

4. Temperature sensing apparatus according to claim 3, wherein the cavity is pressure-sealed and the substrate is substantially incompressible.

5. Temperature sensing apparatus according to claim 3, wherein the cavity is at least partially filled with a fluid with a high thermal conductivity.

6. Temperature sensing apparatus according to claim 1, wherein the wavelength-selective element is attached to the substrate by means of mechanical clamps.

7. Temperature sensing apparatus according to claim 1, wherein the wavelength-selective element is attached to the substrate by means of an adhesive.

8. Temperature sensing apparatus according to claim 7, wherein the adhesive is chosen from one of solder and epoxy-resin.

9. Temperature sensing apparatus according to claim 1, wherein the wavelength-selective element is embedded in the substrate.

10. Temperature sensing apparatus according to claim 1, wherein the wavelength-selective element is partially embedded in the substrate.

11. Temperature sensing apparatus according to claim 1, wherein the wavelength-selective element is covered with at least one additional coating of a material with a low bulk modulus.

12. Temperature sensing apparatus according to claim 11, wherein the material with a low bulk modulus is an organic polymer.

13. Temperature sensing apparatus according to claim 12, wherein the polymer is chosen from one of polystyrene, Rexolite, Hytrel 5526 and polyurethane 3130.

14. Temperature sensing apparatus according to claim 1, wherein two or more wavelength-selective elements are arranged so as to further reduce the pressure dependence.

15. Temperature sensing apparatus according to claim 1, wherein the wavelength-selective element is an in-fibre grating made substantially of silica with a small dopant content.

16. Temperature sensing apparatus according to claim 15, wherein the dopant is chosen from one of germania, phosphorus and aluminium.

17. Temperature sensing apparatus according to claim 1, wherein the substrate comprises a metal.

18. Temperature sensing apparatus according to claim 17, wherein the metal is chosen from one of tin, lead and antimony.

19. Temperature sensing apparatus according to claim 1, wherein the detection system comprises an optical filter and a photodetector.

20. Temperature sensing apparatus according to claim 1, wherein the detection system comprises an interferometric interrogation system.

* * * * *